March 4, 1969  E. L. KOCHEY, JR  3,431,027
FLOW DIVIDER FOR PNEUMATICALLY CONVEYED STRINGY MATERIAL
Filed Dec. 15, 1967

INVENTOR.
EDWARD L. KOCHEY JR.

United States Patent Office 3,431,027
Patented Mar. 4, 1969

3,431,027
FLOW DIVIDER FOR PNEUMATICALLY CONVEYED STRINGY MATERIAL
Edward L. Kochey, Jr., Colebrook, Conn., assignor to Combustion Engineering, Inc., Windsor, Conn., a corporation of Delaware
Filed Dec. 15, 1967, Ser. No. 691,043
U.S. Cl. 302—28
Int. Cl. B65g 53/42, 53/52
8 Claims

ABSTRACT OF THE DISCLOSURE

An apparatus for dividing a stream of pneumatically conveyed stringy material into two streams. The inlet to a cylindrical chamber is eccentrically located to provide a whirling motion within the chamber. An outlet is located at each end of the cylindrical chamber to allow lateral movement of the material in both directions from the inlet. An outlet duct is located at each end eccentric of the cylinder centerline to receive the material in the direction of the whirling motion. The outboard side of this outlet duct is flush and tangent with the cylinder wall. The inboard side of the duct is flared to be approximately flush with the opposite side of the cylinder.

Background of the invention

This invention relates to pneumatic conveying ducts and in particular to an apparatus for dividing a single stream into two streams. It is useful where the material being conveyed has stringy characteristics.

When a pneumatic conveying system is used to convey particulate matter, the usual problems are slugging of the material at low velocities, and erosion of the ducts by the material at higher velocities. When the flow is divided into two streams, these same problems are usual. When the material is of a long and stringy nature, the problem of slugging still exists. Erosion however is generally a minor problem due to the material characteristics. A major difficulty with stringy material arises when an attempt is made to split a single stream into two streams.

An example of a situation where such division is desirable is shown in U.S. Patent No. 3,387,574 issued June 11, 1968, where a pneumatic conveying system is used to convey bagasse to several corners of a tangentially fired furnace.

When the conventional wye type flow divider is used, fibers of the material tend to hang up or become lodged on the crotch of the wye. While most of the material will be diverted to one branch or the other, some material will be generally equally balanced and remain in that location. Experience has shown that after a short time a number of these particles accumulate with a buildup occurring so that one branch of the wye is completely blocked.

Summary of the invention

In my invention the problem of plugging of a flow divider by stringy material is avoided by avoiding direct impact on any surface of the flow divider. An eccentric inlet provides sweeping action throughout a cylindrical chamber where the division actually takes place. Projecting edges are avoided in the duct which carries the divided material from the chamber. Supplementary clean air supply lines are supplied on either side of the cylindrical chamber to adjust the distribution of the conveyed material.

Description of the preferred embodiment

Figure 1:
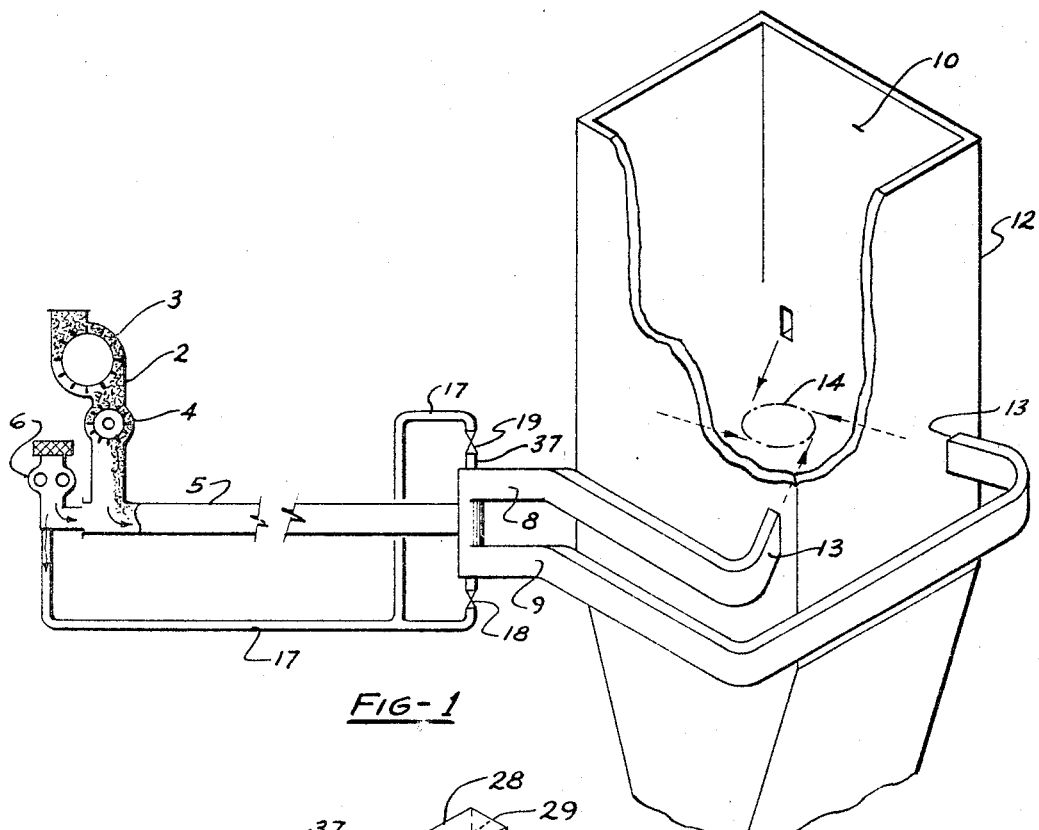
FIGURE 1 is a schematic diagram of a pneumatic conveying system used for conveying bagasse from a supply source to a furnace and employing the inventive flow divider.

Referring to FIGURE 1, bagasse 2 is fed from a supply hopper 3 via feeder 4 into a pneumatic conveying line 5. Air for the pneumatic conveying line is supplied by compressor 6 at a pressure between 2 and 50 p.s.i. depending on the length of line through which the material is to be conveyed.

The material conveyed through line 5 passes to the flow divider 7 where it is divided into two streams, one passing through line 8 with the other stream passing through line 9. The material then is fired into furnace 10 of a steam generator 12 through burners 13. These burners direct the stream tangentially to an imaginary circle 14 located within the furnace. Similar equipment supplies fuel to the other two corners of the furnace and may also supply burners at other elevations. A detailed description of this over-all system may be found in U.S. Patent No. 3,387,574 issued June 11, 1968.

An auxiliary supply of air from the compressor 6 is also supplied through line 17 to opposite ends of the flow divider 7 through valves 18 and 19. This air supply is used to adjust the distribution of the divided material as will be more particularly described hereinafter.

Figure 2:
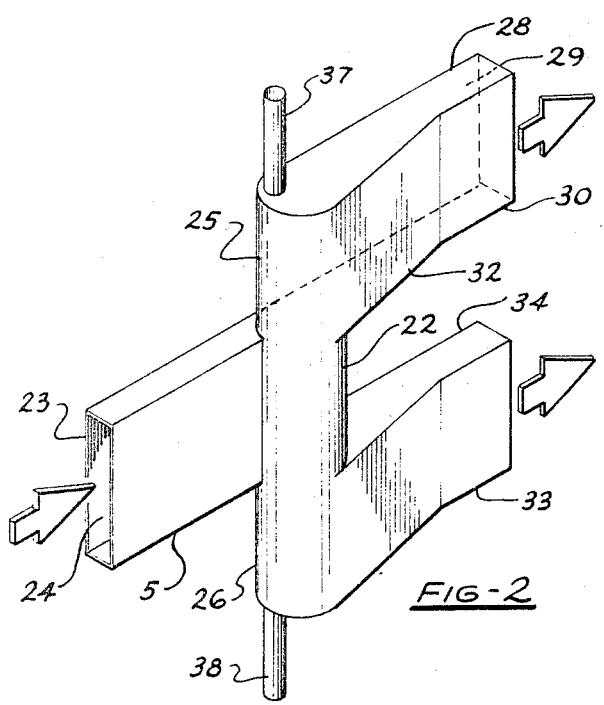
FIGURE 2 is a detailed isometric drawing of the flow divider.

FIGURE 2 is an isometric view of the flow divider 7. This flow divider has a cylindrical chamber 22 which is supplied with the conveyed material through inlet duct 5. The outboard edge 23 of this duct is generally flush with the wall of the cylindrical chamber 22. The width of the duct is less than half the diameter of the cylinder so that the projection of the duct area is completely eccentric of the centerline of the cylindrical chamber 22.

Material conveyed through the inlet duct into the chamber at high velocity establishes a whirling motion within the chamber with a portion of the flow traveling helically upward to the cylindrical extension 25 while the remaining portion travels helically downwardly to the cylindrical extension 26. Stringy material such as bagasse is relatively light in weight but has extensive surface, and therefore can readily be kept in suspension despite the force of gravity. Therefore, the flow divider may be located in the vertical position, as shown, although it could, of course, also be located with the axis of the cylindrical chamber horizontal.

The division of the material takes place in the cylinder where there are no sharp projecting edges against which the material flows. Therefore, there is no opportunity for the stringy material to get caught on any projection, and any buildup of the bagasse is thereby avoided. This avoids plugging of either of the branches which has been a problem in the prior art.

Outlet duct 28 is connected to the upper cylindrical extension 25 so that the material flows outwardly from the cylindrical extension into the duct in the same direction in which it is already rotating. The outer wall 29 of this duct is flush with the wall of the cylindrical extension 25 thereby again avoiding any sharp edge on which the bagasse can get caught, building up an obstruction to flow. The inboard side 30 of the duct may also be flared through wall portion 32 such that it is tangent with the wall of the upper cylinder 25. This wall should be so located as to produce a gradually reducing section with the wall at an angle of less than 45° so as to preclude any buildup of material in the reducing section of the duct. While it is possible that some material may collect on the floor of the reducing section of the duct, this is unlikely due to the high velocities set up by the rotating motion. However even if some material does tend to buildup, there are no sharp edges on which this material may become caught. It therefore will in due course be swept away due to the air velocity without the continued buildup of material and subsequent blockage as experienced by the prior art flow dividers. The material is then conveyed through duct 8 to the furnace as previously described.

Outlet duct 33 is similarly located with respect to the lower cylindrical extension 26 with outboard duct wall 34 also being tangent to the wall of the cylindrical extension 26. This duct then supplies duct 9 which also conveys the bagasse to the furnace as previously described.

Ducts 8 and 9 should be properly sized so that despite their length the same draft exists in each duct with the same flow. This permits equal distribution of the air and bagasse to the two corners of the furnace.

Maldistribution of the bagasse can occur for several reasons. It may be poorly distributed in the supply duct 5 with this mounted distribution being carried on through the outlet ducts. When used at low velocities, gravity may become sufficiently significant to establish a slight maldistribution. Alternately because of particular furnace characteristics, it may be desirable to establish a particular distribution of the bagasse between the two ducts 8 and 9 which is not equal. In order to regulate the distribution as required, an upper air line 37 is connected to the upper end of the cylindrical extension 25. This air line is supplied with air through lines 17 and may be regulated with valve 19 introducing air into the upper chamber in a direction parallel to the axis of the chamber. Air introduced in this line is intended to pass through the outlet duct 28. The bagasse in the divider will tend to be heavily concentrated near the outer wall of the cylinder due to the centrifugal action. Therefore line 37 is located near the wall of the cylindrical extension 25. By introducing the air at this location, it will have a definite effect in rejecting the bagasse flow toward the upper outlet duct. While the air introduction would have some efficacy if introduced at low velocity along the axis of the cylindrical extension, there could be a tendency for the air stream to project completely through the flow divider so that the introduced air flow passes out through the lower outlet duct 33. Introducing air at this desired eccentric location not only tends to reject the bagasse which is passing to the upper duct but increases the air flow through the upper duct thereby increasing the pressure drop through duct 8. In order to achieve an equilibrium condition, more flow passes from the cylindrical chamber 22 downwardly and out through duct 33 and through duct 9. Since the total increase in flow through duct 9 comes from the bagasse laden air in the cylindrical chamber 22, a higher percentage of the bagasse is passed through duct 9.

A second air line 38 is located at the lower end of the end of the flow divider. Air regulated by valve 18 passes through this line into the lower cylindrical extension 26 operating in the same manner as the upper air line 37. Valves 18 and 19 may be operated to selectively distribute a flow of air to either end of the flow divider in such a manner as to balance the flow of bagasse through ducts 8 and 9 should there be a maldistribution or to controllably provide a maldistribution if desired for any purpose.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:
1. A flow divider for dividing a confined stream of pneumatically conveyed stringy material into two confined predominately longitudinal flowing streams comprising: a cylindrical chamber; an inlet duct connected to said cylindrical chamber, said duct having its axis perpendicular to the axis of the cylindrical chamber but eccentric of the cylindrical chamber centerline; and outlet ducts connected to opposite ends of said cylindrical chamber, said outlet ducts arranged so as to effectively dissipate the rotating motion imparting in the cylindrical chamber before egress of the pneumatically conveyed material from the duct, whereby a predominently longitudinal flow of the conveyed material is effected.

2. An apparatus as in claim 1 wherein the projection of the entire flow area of the inlet duct is eccentric of the centerline of the cylindrical chamber.

3. An apparatus as in claim 2 wherein each outlet duct comprises: a cylindrical extension of said cylindrical chamber; a downstream portion of the duct; and a duct reducing section having sides at a slope of less than 45° connecting the cylindrical extension portion of the duct with the downstream portion of the duct.

4. A flow divider for dividing a stream of pneumatically conveyed stringy material into two confined streams comprising: a cylindrical chamber; an inlet duct connected to said cylindrical chamber, said duct having its axis perpendicular to the axis of the cylindrical chamber but eccentric to the cylindrical chamber centerline; a cylindrical extension on each end of said cylindrical chamber and [an] outlet ducts connected to each of said cylindrical chambers, said outlet ducts having their axis perpendicular to that of said cylindrical chamber and each having one edge thereof flush with the outer wall of the respective cylindrical extension.

5. An apparatus as in claim 4 wherein said outlet duct is rectangular and the edge flush with the wall of the cylindrical extension comprises one side of the duct.

6. An apparatus as in claim 5 having also: means for introducing clean air selectively on either side of said cylindrical chamber.

7. An apparatus as in claim 6 wherein said air is introduced parallel to the axis of said cylindrical chamber and adjacent the wall of said cylindrical chamber.

8. An apparatus as defined in any one of claims 4, 5, 6, and 7 wherein the projection of the entire flow area of the inlet ducts is eccentric to the centerline of the cylindrical chamber.

References Cited
UNITED STATES PATENTS

| 1,710,832 | 4/1929 | Mart | 239—468 |
|---|---|---|---|
| 2,642,950 | 6/1953 | Clark et al. | 239—468 |
| 3,016,063 | 1/1962 | Hausmann | 302—28 |
| 3,265,442 | 8/1966 | Willis, Jr., et al. | 302—28 |

ANDRES H. NIELSEN, *Primary Examiner.*

U.S. Cl. X.R.

302—42, 63